Figure 4:
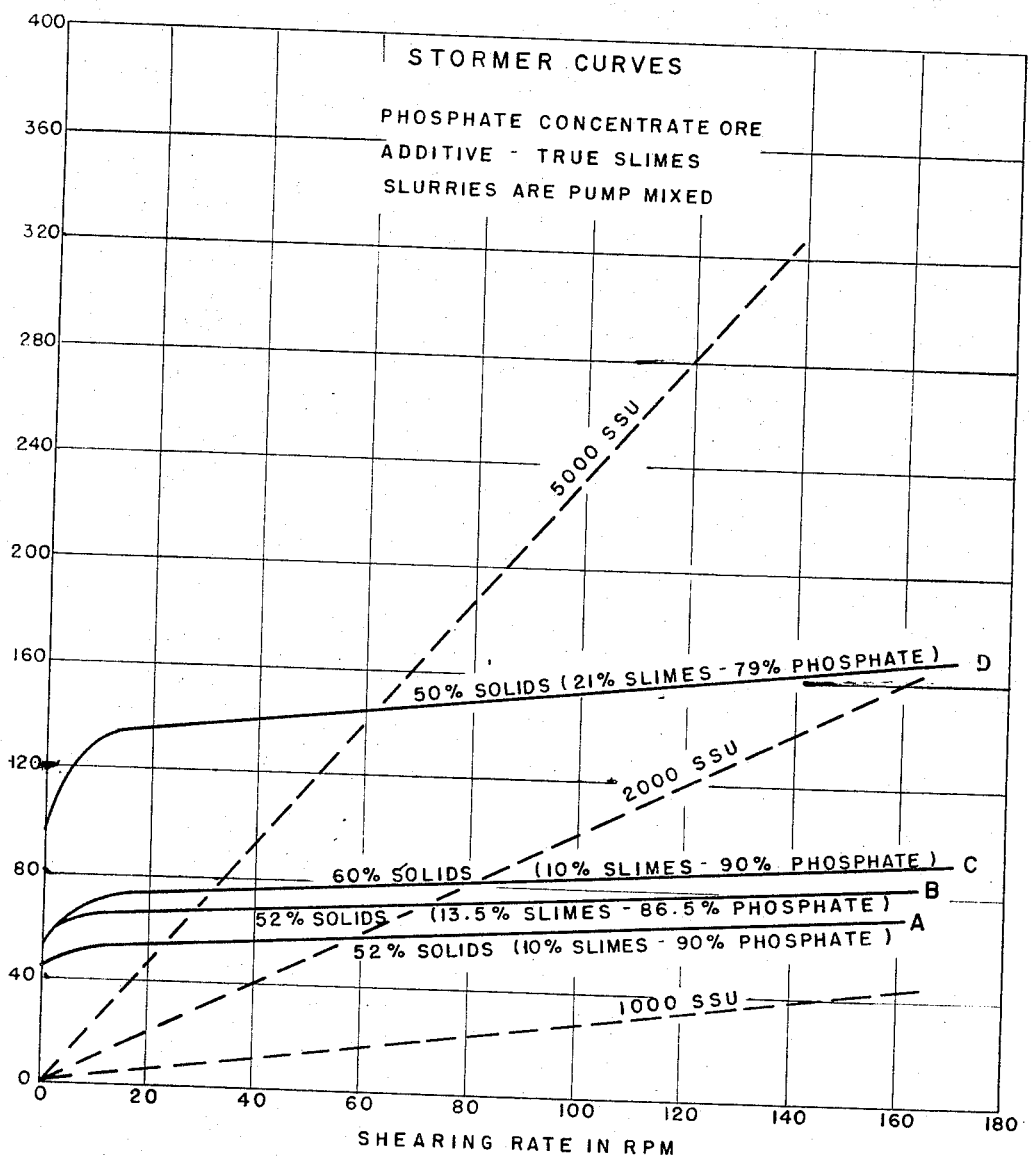

April 18, 1967     D. G. ANDERSON ET AL     3,314,730
TRANSPORTATION OF SOLIDS BY PIPELINE
Filed March 31, 1966     2 Sheets-Sheet 1
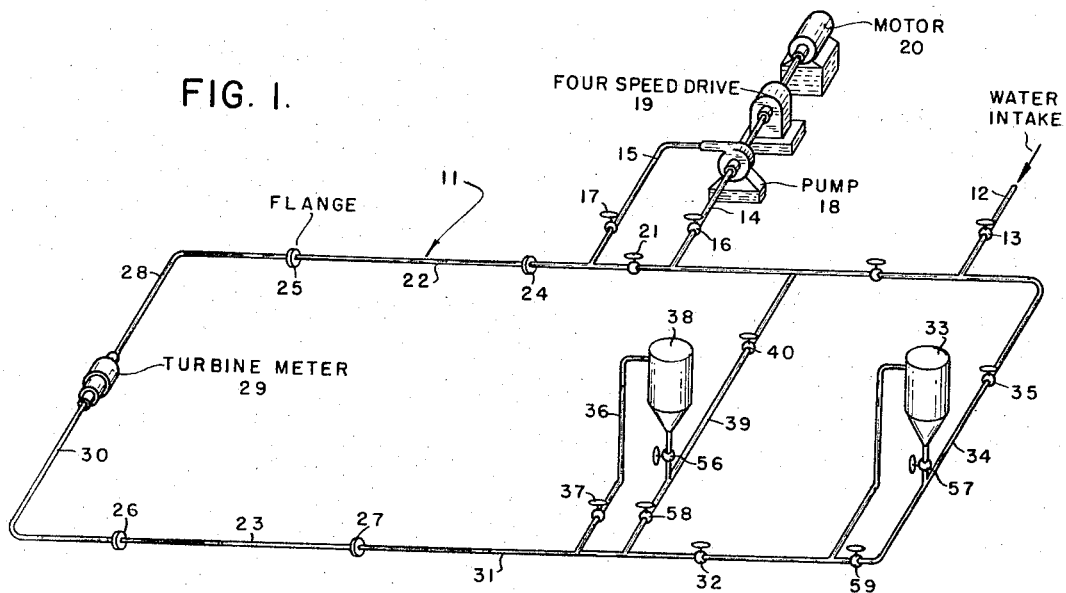
FIG. 1.
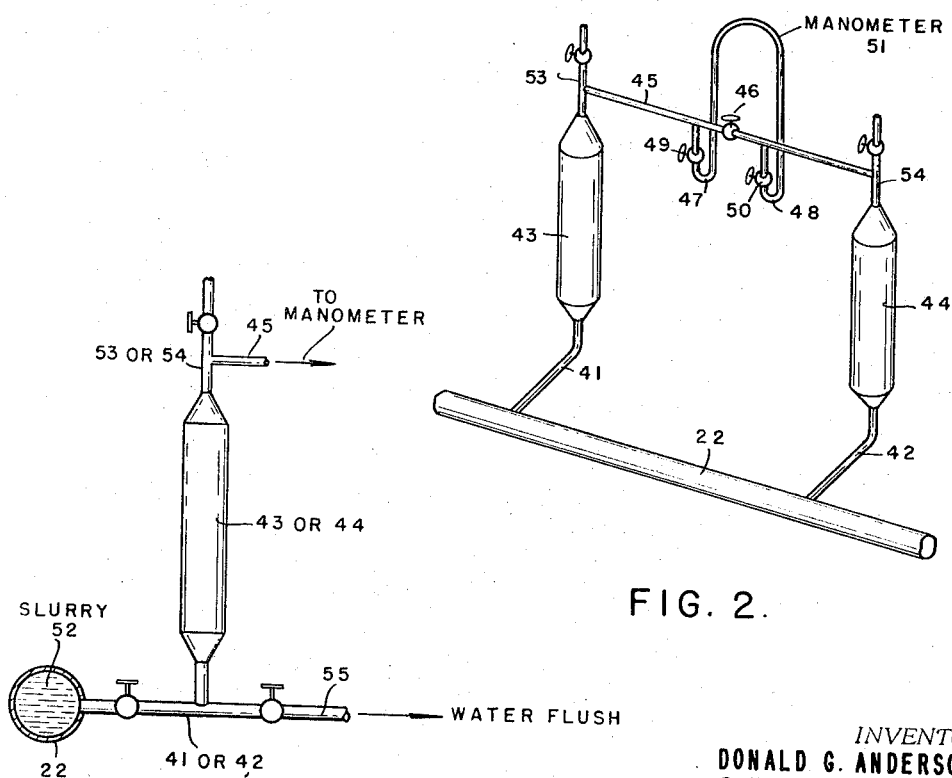
FIG. 2.
FIG. 3.
INVENTORS.
DONALD G. ANDERSON,
RAYMOND H. PFREHM,
BY
ATTORNEY.

United States Patent Office 3,314,730
Patented Apr. 18, 1967

3,314,730
TRANSPORTATION OF SOLIDS BY PIPELINE
Donald G. Anderson and Raymond H. Pfrehm, both of Houston, Tex., assignors to Esso Research and Engineering Company
Filed Mar. 31, 1966, Ser. No. 539,024
9 Claims. (Cl. 302—14)

The present invention is directed to transportation of stable suspensions of phosphates. More particularly, the invention is concerned with the formation and pumping of stable slurries or suspensions of phosphates. In its more specific aspects, the invention is concerned with pumping a stable suspension of granular phosphate.

The present invention may be briefly described as a method for pumping a stable suspension of granular phosphate in which a stable suspension of the granular phosphate in water is formed by admixing finely divided kaolinitic material with water and the granular phosphate followed by pumping the stable suspension and recovering the granular phosphate and kaolinitic material from the pipe line.

The stable suspension is formed by admixing finely divided kaolinitic material with water and the granular phosphate to form a stable suspension having a solids content within the range from about 49% to about 60% by weight and containing from about 40% to about 51% by weight of water. A suitable slurry or suspension may contain about 53% by weight of solids and about 47% by weight of water.

The solids of the suspension contain from about 10% to about 15% by weight of kaolinitic material and from about 85% to about 90% by weight of granular phosphate. A mixture of 13.5% by weight of kaolinitic material and 86.5% by weight of granular phosphate may be formed into a stable suspension.

The invention is also directed to the stable suspension per se containing the several amounts of granular phosphate, kaolinitic material, and water.

The granular phosphate employed in the present invention is the usual phosphate concentrate obtained by mining phosphate rock. Phosphate concentrates having the following particle size analysis are entirely suitable for formation into stable suspensions and subsequent transportation by pipeline from mine site to the point where the concentrate is to be used or further processed.

TABLE I

| | Batch 1, percent | Batch 2, percent |
|---|---|---|
| Through 28 mesh on 48 mesh | 9 | 0 |
| Through 48 mesh on 100 mesh | 56 | 43 |
| Through 100 mesh on 200 mesh | 28 | 45 |
| Through 200 mesh on 325 mesh | 5 | 8 |
| Through 325 mesh on pan | 2 | 4 |

It is to be noted that over 90% by weight passes through a 48 mesh screen.

Phosphate concentrates as typified by the analyses in Table I are mainly calcium phosphate with impurities and may have a specific gravity within the range from about 2.5 to about 3.0. Batch 1 in Table I has a specific gravity of 2.75. A calcium phosphate concentrate containing about 90% by weight of phosphate and about 10% by weight of impurities, primarily $SiO_2$, and the like, may be used.

The kaolinitic material employed in the present invention is a waste product from mining operations usually called "slimes" and may be obtained from crushed phosphate rock such as that from the Utah mines. The "slimes" may be obtained in a flotation operation or from the washings of crushed phosphate rock. The "slimes" remain after concentrate, scavenger tails, and froth have been removed. The kaolinitic material has a specific gravity of about 2.00 to about 2.25 and is in a finely divided condition. For example, a specific kaolinitic material from a mine in Vernal, Utah, has a specific gravity of 2.07 and all of its particles are smaller than a 325 mesh screen (45 microns). Kaolinitic material having a particle size within the range from about 5 to about 45 microns may be used.

The amounts of kaolinitic material and granular phosphate used are critical. If too much of the kaolinitic material is used, the suspensions are so viscous that they are practically unpumpable. If too little of the kaolinitic material is used, the slurries or suspensions are unstable and solids deposit in the pipeline. Thus, it has been found that in suspensions containing large amounts of the kaolinitic material the viscosity of the suspension is so high that pressure drops through a pipeline would be outside a practical range for pumping. The same holds true for the granular phosphate. The solids content of the suspensions must be within the range from about 49% to about 60%. Suspensions with less than 49% by weight solids are unstable. Above about 60% solids, the suspensions are too viscous. Preferably, the slurries or suspensions have a viscosity at 100 r.p.m. Stormer between about 1000 and about 2000 SSU.

The present invention will be further illustrated by reference to the drawing in which:

FIG. 1 is a diagrammatic flow sheet of a pump loop;
FIG. 2 illustrates a manometer connection for the pump loop of FIG. 1;
FIG. 3 is a view in partial section of a detail of the manometer connection of FIG. 2; and
FIG. 4 is a plot of data illustrating the pumpability of suspensions of the present invention.

Referring now to the drawing, and particularly to FIGS. 1 to 3, numeral 11 designates a pump loop provided with a branch line 12 controlled by valve 13 through which water is introduced into pump loop 11 from a source not shown. Pump loop 11 is provided with branch lines 14 and 15 provided, respectively, with control or throttling valves 16 and 17. Line 14 is the intake to a pump 18 such as a centrifugal pump powered through a drive means 19 by motor or power means 20. A bypass valve 21 allows fluid to be conducted to and from pump 18 as has been described. Pipe loop 11 may be suitably made up replaceable sections such as 22 and 23 which may be of a selected length and/or diameter as desired. To this end, flanges 24, 25, 26 and 27 allow different pipe diameters to be employed. Thus, sections 22 and 23 may be made up of 2", 4", 6", 8" or 10" pipe or of any diameter for pumping the slurries or suspensions of the present invention. Likewise, the sections 22 and 23 may be interconnected by sections of the same or different diameter. It is understood, of course, that sections 22 and 23 may also be of the same or different diameter.

A pipe section 28 connects with flange 25 and with a turbine meter 29 which may be a Halliburton turbine meter. In turn, the turbine meter 29 connects by pipe section 30 to flange 26. Connected to flange 27 is line 31 controlled by valve 32 which leads to a hopper tank 33 which in turn connects into pipe loop 11 by line 34 controlled by valve 35.

Line 36 controlled by valve 37 branches from line 31 and connects to hopper tank 38. Hopper tank 38 connects by branch line 39 controlled by valve 40 to pipe loop 11.

The kaolinitic material and/or granular phosphate may be introduced into pipe loop 11 from one or more hopper tanks such as hopper tanks 33 and 38.

Thus, it will be seen that either or both of tanks 33 and 38 may be brought into and form part of loop 11 by suitable manipulation of valves 37, 32 and 35.

In using the pipe loop 11 in the practice of the present invention, water is introduced into loop 11 by line 12 and circulated by pump 18. The pipe loop 11 is provided with means to measure pressure such as a plurality of manometers which may be connected to any of the several sections of the pipe loop 11. Thus, section 22 (FIG. 2) is provided with branches 41 and 42 which lead, respectively, to manometer bottles 43 and 44.

Branching from bottles 43 and 44 is line 45 provided with a valve 46 and with manometer connections 47 and 48, controlled, respectively, by valves 49 and 50 which connect to manometer 51. Manometer 51 allows pressure drop to be measured as the slurry is pumped through the several sections of pipe loop 11.

FIG. 3 shows the manometer bottles 43 or 44 and connections in more detail. The purpose of these bottles and connections is to maintain the manometers such as 51 free of the slurry or suspension 52 being pumped through the pipe loop 11. It is to be noted that the bottles 43 and 44 are provided, respectively, with valved lines 53 and 54 by way of which flushing water may be introduced and that lines 41 and 42 may be provided with a valved line 55 for flushing water and/or slurry from the bottle 43 or 44.

It is understood, of course, that the slurries or suspensions may be pumped or recirculated through the pipe loop 11 by way of either or both of lines 39 and 34 by manipulation of valves 56 and 57 and valves 58 and 59. It is to be also understood that pipe loop 11 may be an originating point for pumping slurry or suspension through a pipeline connecting thereto. In such an instance, the pipeline may connect to the loop 11 at any point downstream from pump 18.

In order to illustrate the invention further, a six thousand pound mixture of phosphate concentrate as illustrated by Batch 1 of Table I, kaolinitic material and water was mixed in a pipe loop such as 11 in the following manner:

(1) Water was added to the empty loop.
(2) Kaolinitic material was mixed into the circulating water in the loop.
(3) Phosphate concentrate was mixed into the circulating water-kaolinitic material mixture.

The original slurry contained 58% solids of which 15% was kaolinitic material and 85% of Batch 1 concentrate. The percentage of kaolinitic material was then reduced to 13.5% by weight by adding more concentrate. The slurries were then tested at solids percentages of 58% and 49%. It was found that the 13.5% by weight of kaolinitic material provided a good balance between suspension and viscosity. Slurries with less than 49% by weight solids were found to be unstable.

Referring now to FIG. 4, pumping studies were conducted on four phosphate-kaolinitic material slurries. Curves A and B were obtained with the Batch 2 concentrate illustrated in Table I while curves C and D were made up with Batch 1 concentrate. It is to be noted that curve D on a slurry containing 21% by weight of kaolinitic material shows a considerable viscosity increase over curves A, B, and C even though the solids percentage is much lower for the curve D slurry than in the other slurries. Thus, the kaolinitic material, if used in excessive amounts, increases the viscosity of the suspension or slurry to the point the slurry cannot be pumped economically. On the other hand, slurries A, B and C at 100 r.p.m. Stormer are all between 1000 and 2000 SSU which indicates satisfactory pumpability in a commercial pipeline.

After the slurries or suspensions have been pumped through a pipeline to their destination, the phosphate concentrate may be recovered by adding water to the slurries and separating the concentrate. Other recovery means alone or in combination with adding water such as centrifugation, settling, filtration and the like may be used.

The invention is quite important and useful. A waste product from mining operations has been found to be useful in making pumpable stable suspensions of phosphate concentrate which allows the suspensions to be pumped for long distances across country from mine to destination without great cost. Heretofore, it was necessary to transport phosphate concentrate by other more expensive means which in accordance with the present invention has been obviated.

The data presented to illustrate the present invention was obtained on a pipe loop such as 11 and with a modified Stormer viscometer. The modification involved changing the cup to remove the two partitions from the normal cup and to provide a cup having no partitions but a pedestal in the center to retard rotation of the slurry being tested. The modified cup was used in all tests where Stormer viscosity is shown.

The nature and objects of the present invention having been completely described and illustrated and the best mode contemplated set forth, what we wish to claim as new and useful and secure by Letters Patent is:

1. A method for pumping phosphate which comprises:
    forming a stable suspension of granular phosphate, finely divided kaolinitic material, and water having a solids content within the range from about 49% to about 60% by weight and containing from about 40% to about 51% by weight of water;
    said solids containing from about 10% to about 15% by weight of said kaolinitic material and from about 85% to about 90% by weight of said granular phosphate;
    pumping said suspension through a pipeline; and
    recovering said solids from said suspension pumped through said pipeline.

2. A method in accordance with claim 1 in which said finely divided kaolinitic material is recovered from crushed phosphate rock.

3. A method in accordance with claim 1 in which said finely divided kaolinitic material is composed of particles smaller than 325 mesh.

4. A method in accordance with claim 1 in which the suspension has a Stormer viscosity at 100 r.p.m. within the range from about 1000 to about 2000 SSU.

5. A method in accordance with claim 1 in which said solids contain about 13.5% by weight of said kaolinitic material and about 86.5% by weight of said granular phosphate.

6. A method in accordance with claim 1 in which the granular phosphate has a particle size distribution such that at least 90% by weight passes through 48 mesh.

7. A stable suspension suitable for pumping through a pipe which comprises:
    granular phosphate, finely divided kaolinitic material and water, said suspension having a solids content within the range from about 49% to about 60% by weight and containing from about 40% to about 50% by weight of water;
    said solids containing from about 10% to about 15% by weight of kaolinitic material and from about 85% to about 90% by weight of said granular phosphate.

8. A stable suspension in accordance with claim 7 in which said kaolinitic material is composed of particles smaller than 325 mesh.

9. A suspension in accordance with claim 7 which has a Stormer viscosity at 100 r.p.m. within the range from about 1000 to about 2000 SSU.

No references cited.

EVON C. BLUNK, *Primary Examiner.*

M. L. AJEMAN, *Assistant Examiner.*